(12) United States Patent
Abraham et al.

(10) Patent No.: US 8,854,454 B2
(45) Date of Patent: Oct. 7, 2014

(54) CHASSIS TESTING UNIT AND METHOD FOR TESTING A CHASSIS

(75) Inventors: Steffen Abraham, Hildesheim (DE); Wolfgang Niehsen, Bad Salzdetfurth (DE)

(73) Assignee: Robert Bosch GmbH, Stuttgart (DE)

( * ) Notice: Subject to any disclaimer, the term of this patent is extended or adjusted under 35 U.S.C. 154(b) by 890 days.

(21) Appl. No.: 12/737,732

(22) PCT Filed: Jul. 7, 2009

(86) PCT No.: PCT/EP2009/058587
§ 371 (c)(1),
(2), (4) Date: Apr. 27, 2011

(87) PCT Pub. No.: WO2010/023015
PCT Pub. Date: Mar. 4, 2010

(65) Prior Publication Data
US 2011/0193955 A1 Aug. 11, 2011

(30) Foreign Application Priority Data
Sep. 1, 2008 (DE) .................. 10 2008 041 732

(51) Int. Cl.
*H04N 17/02* (2006.01)
*H04N 9/47* (2006.01)
*G01M 17/04* (2006.01)

(52) U.S. Cl.
CPC .................................. *G01M 17/04* (2013.01)
USPC ......................................... 348/135; 348/180

(58) Field of Classification Search
USPC .............................. 348/135, 64, 139, 142, 180
See application file for complete search history.

(56) References Cited

U.S. PATENT DOCUMENTS 6,748,796 B1 6/2004 Van Den Bossche

FOREIGN PATENT DOCUMENTS

| DE | 199 49 982 | | 5/2001 |
| EP | 1 098 187 | | 5/2001 |
| FR | 0950264 | * | 1/2009 |
| JP | 05223700 A | * | 8/1993 |

OTHER PUBLICATIONS

M. Gobbi et al.: "Indoor testing of road vehicle suspensions" Meccanica (2008), Bd. 43, Nr. 2, Feb. 28, 2008, pp. 173-184.
Barrett, J.: "Lasers Improve Accuracy of Suspension Testing," Eureka, Findlay Publications Ltd., Bd. 10, Nr. 2, Feb. 1, 1990, pp. 42, 43, 44, 46.

\* cited by examiner

*Primary Examiner* — Robert Chevalier
(74) *Attorney, Agent, or Firm* — Kenyon & Kenyon LLP (57) ABSTRACT

A chassis testing unit (2) according to the present invention, in particular a shock absorber testing unit, for a vehicle on a test set-up (4) includes at least one correlation sensor (14-18), having an associated lens, situated at the side of the test set-up (4). The correlation sensor (14-18) is directed toward the test set-up (4), and is designed to detect a time sequence of images of a section of a motor vehicle (6), in particular of the body of the motor vehicle (6) and of the motor vehicle wheel, moving on the test set-up (4), and to determine directional velocity components therefrom. The chassis testing unit also includes a data processing unit which is connected to the correlation sensor or correlation sensors (14-18), and which is designed to determine the motion of the motor vehicle, in particular of the body of the motor vehicle (6) and of the motor vehicle wheel, on the basis of the directional velocity components of the correlation sensor or correlation sensors (14-18).

14 Claims, 8 Drawing Sheets

CHASSIS TESTING UNIT AND METHOD FOR TESTING A CHASSIS

BACKGROUND OF THE INVENTION

1. Field of the Invention

The present invention relates to a chassis testing unit and a method for testing a chassis.

2. Description of Related Art

Various testing devices and test methods are currently used in the testing of shock absorbers of a motor vehicle in a motor vehicle service facility. In the drop indicator principle, a dying-out process is mechanically excited using a drop indicator, and the dynamic wheel contact forces during the dying-out process are measured. The dynamic measurement of wheel contact forces requires a costly sensor system, and the values thus measured allow parameters of only limited usefulness to be ascertained for the shock absorber.

SUMMARY OF THE INVENTION

The object of the present invention, therefore, is to provide an inexpensive chassis testing unit and a cost-effective chassis testing method via which accurate measuring results and meaningful parameters for the chassis are obtained.

For a chassis testing unit according to the present invention, in particular a shock absorber testing unit, image-based correlation sensors are used for the dynamic measurement of the body and wheel motion during the chassis testing, in particular during the shock absorber testing. These image-based correlation sensors are very inexpensive. The body and wheel motion may be detected with relatively high resolution and with great precision by using multiple image-based correlation sensors. The correlation sensors provide the x and z motion, i.e., in the horizontal and vertical directions, respectively, over time of the observed measuring section on the wheel or the body during the vibration. This results in exact imaging of the vibration behavior, which allows good results in the subsequent evaluation of the vibration, as well as an objective chassis evaluation, in particular a shock absorber evaluation.

Various combinations and configurations of correlation sensors are generally possible, provided that they detect only suitable points on the body and on the motor vehicle.

According to the present invention, a relatively costly video sensor system and optionally a relatively costly force measuring sensor system may be dispensed with by use of the correlation sensors.

The accuracy of the measuring results may be further increased when the correlation sensors according to the present invention are used in combination with a video sensor system, a force measuring sensor system, or both.

As a result of the direct observation according to the present invention of the motion of the wheel together with the wheel rim, interfering influences which frequently occur in force measurement, for example, may be largely avoided.

The image-based correlation sensors may preferably be connected to a switching circuit having an ASIC, which performs a high-frequency correlation measurement, i.e., a displacement measurement, in real time. Due to the preprocessing of the measured data on the switching circuit of the correlation sensor, the subsequent evaluation of the measured data may optionally be implemented on a low-cost microcontroller such as a PIC controller, for example, resulting in further potential cost savings.

According to a further advantage of the present invention, the correlation sensors provide measured data which are already preprocessed, in particular with regard to the velocity components in the x and z directions, thus reducing the requirement for the subsequent evaluation of measured data.

It is advantageous for the quality of the obtained measuring results when the correlation sensors are operated at a high detection frequency of up to 2 kHz. The correlation sensors compute a correlation between two image regions recorded at immediately consecutive points in time.

In principle, any given correlation sensors may be used as correlation sensors; suitable correlation sensors have an image array of 15×15 pixels, for example. One example of a suitable correlation sensor is the ADNS-5030 low power optical mouse sensor from Avago Technologies Ltd. This sensor has a 15×15 imager which is connected to an ASIC for data evaluation, and is manufactured for use in computer mice.

The chassis testing unit according to the present invention may be used for all current customary chassis test stands, in particular shock absorber test stands, in particular for test stands having drop indicators, test stands having vibration plates, for driving over an obstacle on the floor of the test set-up, or for rocking processes.

The present exemplary embodiments described with reference to the chassis testing unit according to the present invention and the associated advantages similarly result for the method according to the present invention for testing a chassis, in particular a shock absorber of a motor vehicle; these are expressly included in the disclosure of the present invention.

Moreover, the present invention relates to the use of a correlation sensor or multiple correlation sensors of the type described herein for chassis testing, in particular for shock absorber testing, of a motor vehicle.

The present invention is explained in greater detail below on the basis of exemplary embodiments, with reference to the accompanying figures.

BRIEF DESCRIPTION OF THE DRAWINGS

FIG. 3 shows a schematic view of a first correlation sensor system with reference to a first subfigure 3(a), and a schematic view of a second correlation sensor system, with reference to a second subfigure 3(b), according to one exemplary embodiment of the present invention.

FIG. 4 shows a correlation sensor image at a point in time t=i with reference to a first subfigure 4(a), and a second correlation sensor image at a point in time t=i+1 with reference to a second subfigure 4(b), according to one exemplary embodiment of the present invention.

DETAILED DESCRIPTION OF THE INVENTION

Figure 1:
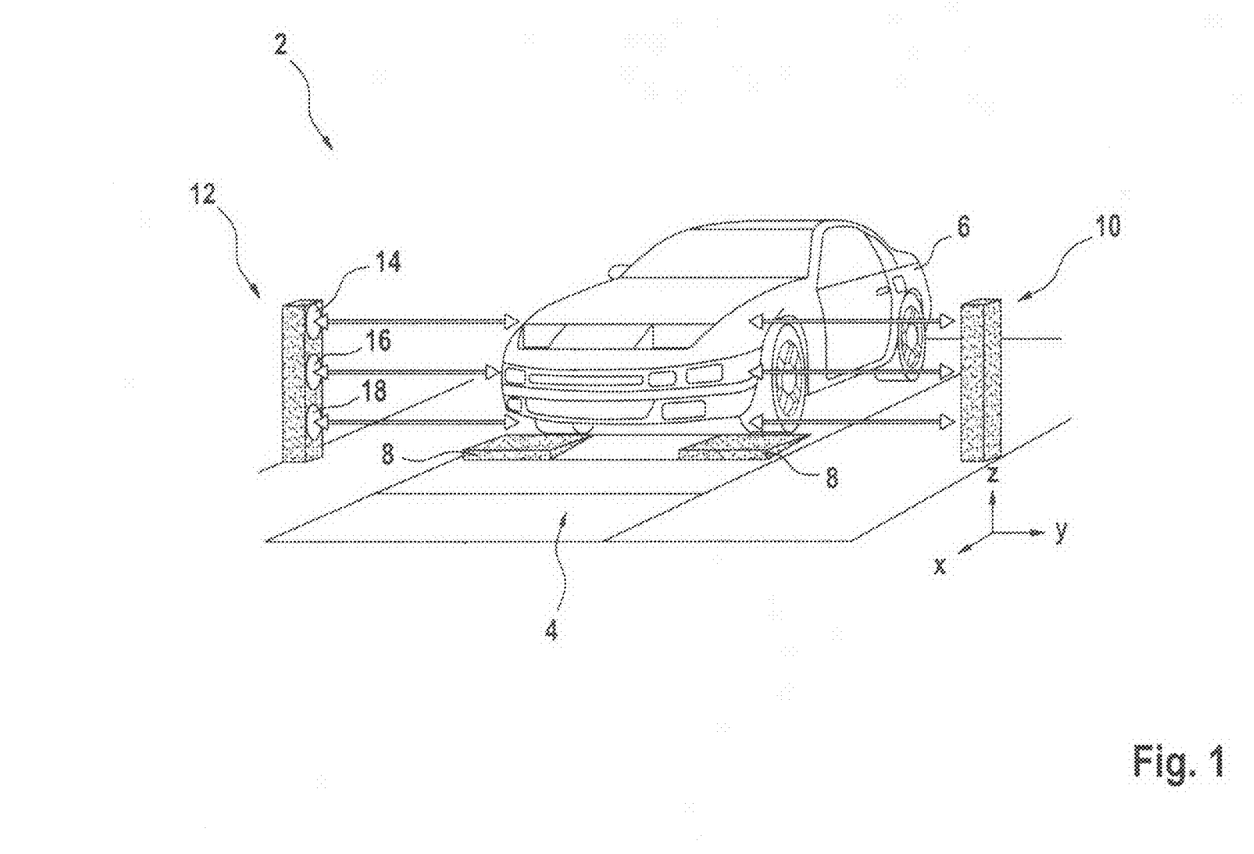
FIG. 1 shows a perspective illustration of a shock absorber testing unit according to one exemplary embodiment of the present invention.

FIG. 1 shows a perspective illustration of a shock absorber testing unit 2 according to one exemplary embodiment of the present invention.

Shock absorber testing unit 2 is situated on a test set-up 4, and is used to measure and test the shock absorbers of a motor vehicle 6; motor vehicle 6 travels over each of obstacles 8 present on test set-up 4 in order to excite the shock absorbers. A left measuring head 10 is situated on the left side of test set-up 4 at a distance from left obstacle 8, approximately at the height of obstacles 8. Likewise, a right measuring head 12 is situated on the right side of test set-up 4 at a distance from right obstacle 8 and approximately at the height of same. In the illustration of FIG. 1 as an example, the two measuring heads 10 and 12 are designed as cuboidal pillars which are each provided with an upper correlation sensor, a middle correlation sensor, and a lower correlation sensor on their inner side. Although the correlation sensors of left measuring head 10 are not visible in the perspective illustration of FIG. 1, upper correlation sensor 14, middle correlation sensor 16, and lower correlation sensor 18 of right measuring head 12 are clearly visible. The correlation sensors are preferably coupled to a lens having a long focal length, and are mounted at an appropriate distance of 1 m, for example, from the side of the vehicle.

The correlation sensors are aligned in the horizontal direction at the center of test set-up 4, and each detects a small section of the side of motor vehicle 6. In shock absorber testing unit 2 the lower and the middle correlation sensors are each situated at the height of the motor vehicle wheel, and the upper correlation sensor is situated above same, approximately at the height of the fender.

The correlation sensors are connected to a data processing unit, not shown in FIG. 1, for evaluating the measured data delivered by the correlation sensors. The correlation sensors may be provided with a lighting unit or a plurality of such lighting units, not shown in FIG. 1, in order to provide good illumination of the particular observed measuring point on the motor vehicle.

With reference to a coordinate system, the longitudinal direction of the vehicle is designated by x, the transverse direction of the vehicle by y, and the vertical direction by z, and these directional designations are used throughout the present description.

Figure 2:
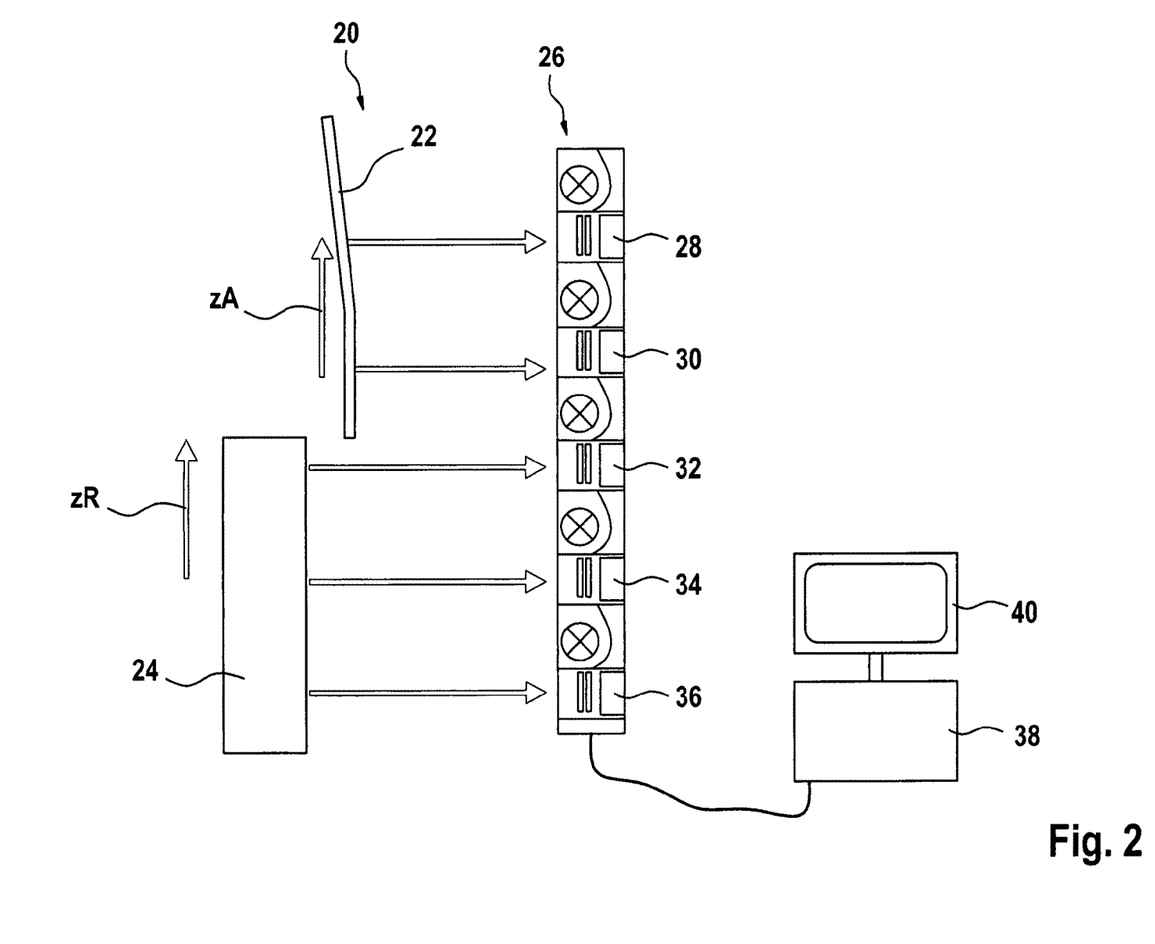
FIG. 2 shows a schematic partial view of the shock absorber testing unit, viewed in the transverse vehicle direction, according to one exemplary embodiment of the present invention.

FIG. 2 shows a schematic partial view 20 of the shock absorber testing unit in the transverse direction of the vehicle.

Pillar-shaped measuring head 26 includes an upper body correlation sensor 28, a lower body correlation sensor 30, an upper wheel correlation sensor 32, a middle wheel correlation sensor 34, and a lower wheel correlation sensor 36. These correlation sensors 28 through 36 have the same design. The correlation sensors have a lens situated in front of the actual correlation sensor, and a lighting unit, for example, an LED light, situated above each correlation sensor. Body correlation sensors 28 and 30 are situated at the height of the body above the motor vehicle wheel, for example, at the height of the fender, and during operation detect the time curve of the vibration of the body, which is also referred to below as the bodywork or vehicle bodywork. Upper wheel correlation sensor 32 is situated at the height of the upper tire wall of motor vehicle wheel 24, the middle wheel correlation sensor is situated at a height corresponding to the center of the wheel rim, and lower wheel correlation sensor 36 is situated approximately at the height of the lower tire wall of motor vehicle wheel 24. Motion vector in the z direction zR of motor vehicle wheel 24 and motion vector zA of vehicle bodywork 22 are schematically illustrated by arrows in FIG. 2.

Also apparent in FIG. 2 is a data processing unit 38, having a display 40, which is connected to correlation sensors 28 through 36 and which receives measuring signals from same in order to evaluate the signals.

Figure 3A:
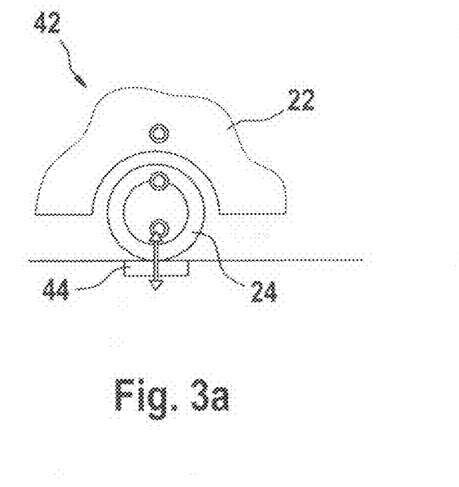
Figure 3B:
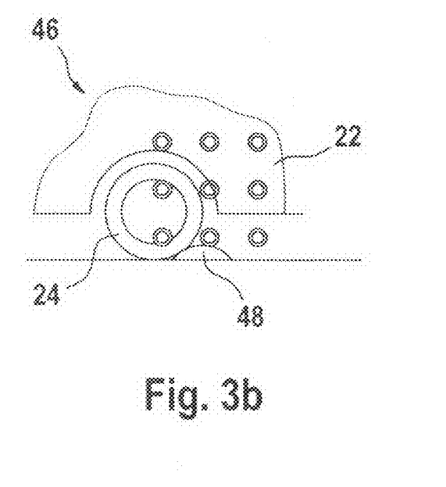

FIG. 3 shows a schematic view of a first correlation sensor system 42 with reference to a first subfigure 3(a), and shows a schematic view of a second correlation sensor system 46 with reference to a second subfigure 3(b).

In first correlation sensor system 42, the motor vehicle wheel rests on a vibration plate 44 which is moved up and down for testing the shock absorber, as indicated by a vertical double arrow in FIG. 3(a). Since the motor vehicle does not move in the longitudinal direction, an upper correlation sensor, a middle correlation sensor, and a lower correlation sensor are sufficient for the shock absorber testing according to the present invention. The upper correlation sensor is situated at the height of the fender, the middle correlation sensor is situated at the height of the upper tire wall, and the lower correlation sensor is situated at the height of a lower region of the wheel rim.

In second correlation sensor system 46, motor vehicle wheel 24 is positioned directly in front of an obstacle 48 to be driven over. The vibration process of the motor vehicle shock absorber is excited by driving over this obstacle 48. For this purpose, second correlation sensor system 46 includes a 3×3 matrix of correlation sensors, the upper correlation sensors being situated at fender height, the middle correlation sensors being situated at the height of the upper edge of the wheel rim, and the lower correlation sensors being situated in a lower region of the wheel rim of motor vehicle wheel 24.

The first column of correlation sensors is situated directly in front of obstacle 48, the second column of correlation sensors is situated approximately at the height of obstacle 48, and the third column of correlation sensors is situated just behind obstacle 48, relative to the longitudinal direction of the motor vehicle.

Figure 4A:
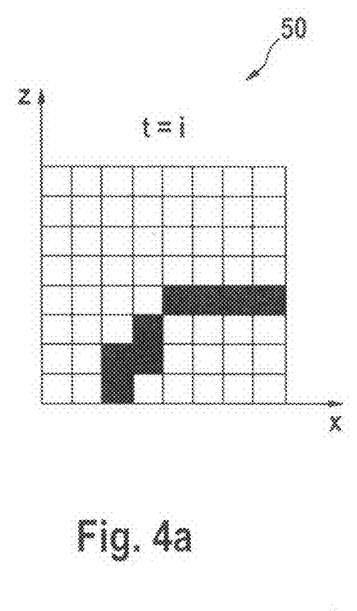
Figure 4B:
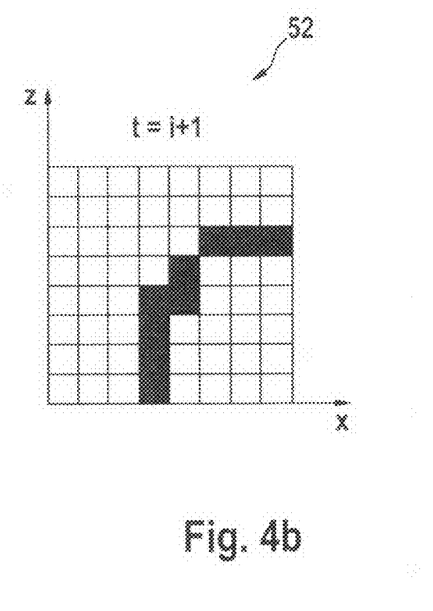

FIG. 4 shows a first correlation sensor image 50 at a point in time t=i with reference to a first subfigure 4(a), and shows a second correlation sensor image 52 at a point in time t=i+1 with reference to a second subfigure 4(b).

The two correlation sensor images 50 and 52 are recorded in immediate succession by the same correlation sensor, during or shortly after a motor vehicle wheel travels over an obstacle.

Both correlation sensor images 50 and 52 display a field of 8×8 pixels. A small section of the side of a motor vehicle is apparent on each of the two correlation sensor images 50 and 52. In first correlation sensor image 50 the following pixels (x, z) are colored black: (3, 1); (3, 2); (4, 2); (4, 3); and (5, 4) through (8, 4). In the second correlation sensor image 52 the following pixels (x, z) are colored black: (4, 1) through (4, 4); (5, 4); (5, 5); and (6, 6) through (8, 6).

Second correlation sensor image 52 is shifted in the x direction by x=1 pixel, and in the z direction by dz=2 pixels, relative to first correlation sensor image 50.

The correlation sensors shown in FIGS. 1 through 4 record images of the side of the motor vehicle in short time intervals, and determine therefrom the displacement of the motor vehicle in the x direction and in the z direction. The correlation sensors thus deliver as an output signal the x and z motions of the motor vehicle over time, in particular of the particular motor vehicle wheel observed or of the particular motor vehicle body observed during the vibration process. The correlation sensors output this displacement, which has occurred, as an output signal to the data processing unit. In FIG. 4 the output signal of the correlation sensor is dx=1 pixel and dz=2 pixels.

Figure 5:
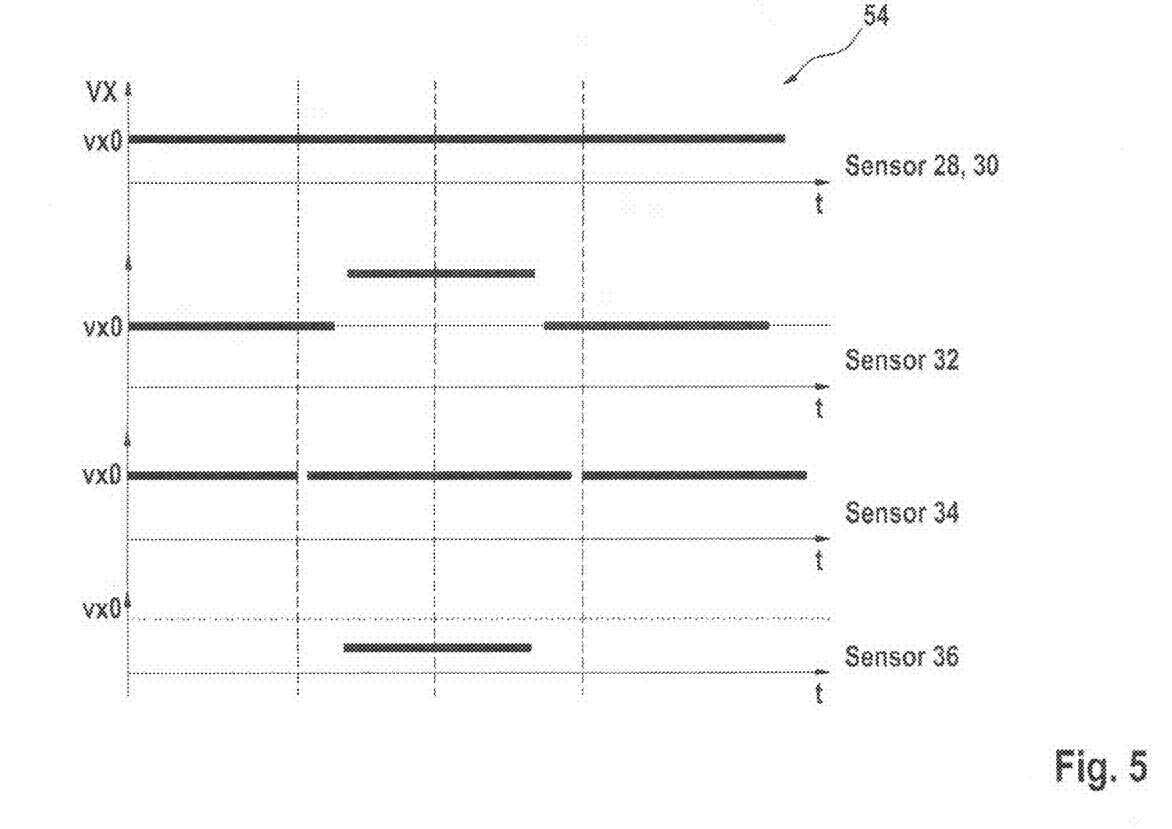
FIG. 5 shows a first example of a time curve of velocity component vx as the motor vehicle travels past the measuring head, together with the correlation sensors from FIG. 2, according to one exemplary embodiment of the present invention.

FIG. 5 shows a first example of a time curve of velocity component vx when the motor vehicle travels past measuring head 26, together with correlation sensors 28 through 36, without the motor vehicle having been excited to vibrate as the result of traveling over an obstacle.

Figure 6:
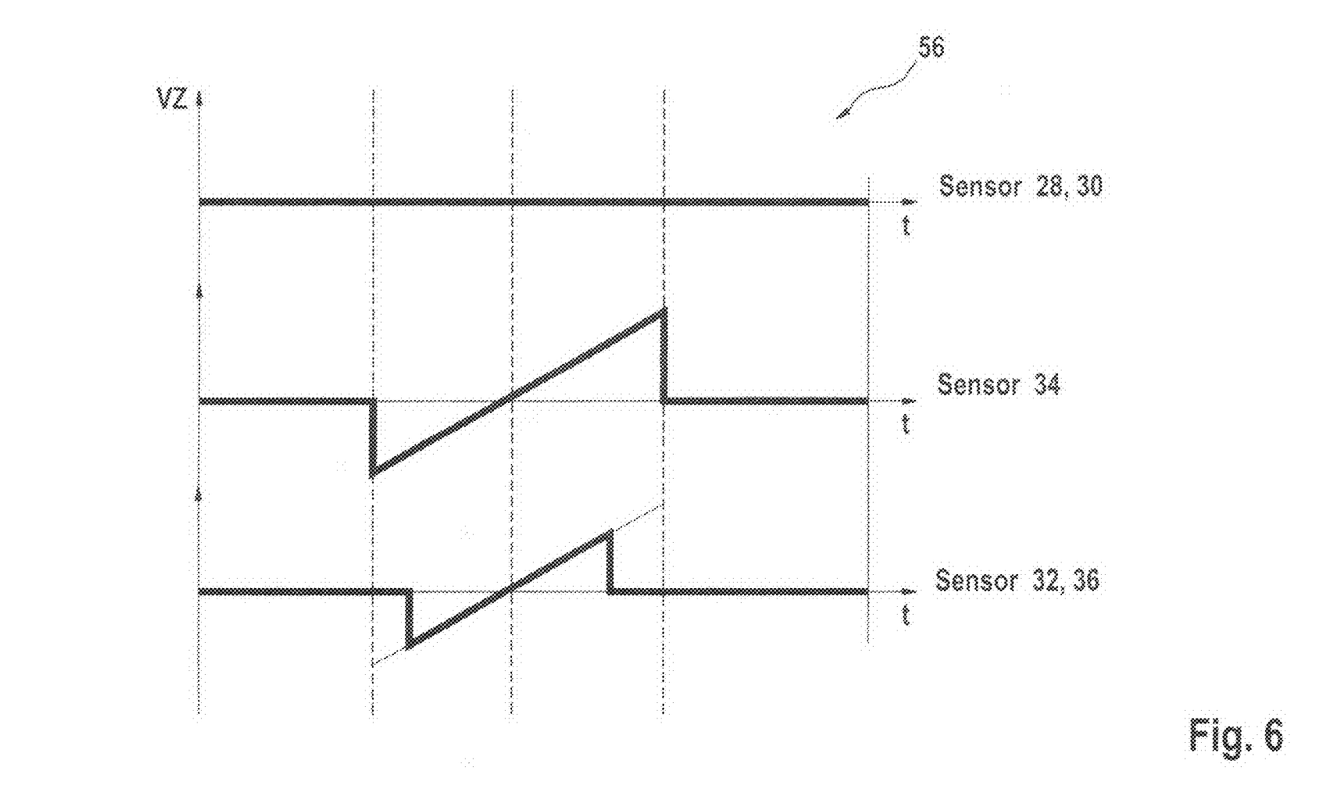
FIG. 6 shows a first example of a time curve of velocity component vz as the motor vehicle travels past the measuring head, together with the correlation sensors from FIG. 2, according to one exemplary embodiment of the present invention.

In the time curve of the first velocity component and in subsequent time curve 56 of the second velocity component in FIG. 6, the output signals of sensors 28 through 36 are illustrated one on top of the other for improved clarity.

The intersection points of the four vertical lines with the time axis are referred to below as points in time t0, t1, t2 and t3 in each of FIGS. 5 and 6.

The output signals of body correlation sensors 28 and 30 are combined. When the motor vehicle travels past at constant speed vx0, for these sensors 28, 30 velocity component vx of the section on the body being observed is also vx in each case. Upper wheel correlation sensor 32 outputs a velocity component vx0 which matches the speed of the motor vehicle in the forward direction as long as the motor vehicle wheel is not in the field of vision. As long as the motor vehicle wheel is in the field of vision, this sensor outputs a velocity component vx which is greater than vx0, since the sensor takes the rolling motion of the tire into account. Middle wheel correlation sensor 34, which is situated approximately at the height of the center of the wheel rim, also outputs a velocity component vx0 in each case which matches the speed of the forward motion of the motor vehicle. During the transition between the body and the tire or wheel rim, and during the transition between the tire or wheel rim and the body, the middle wheel correlation sensor experiences a brief signal interruption. Lower wheel correlation sensor 36 does not detect any section of the motor vehicle as long as the motor vehicle wheel is not in the field of vision of the sensor. The motor vehicle wheel is in the field of vision of the sensor shortly after point in time t1 and up until point in time t3. In this time period the sensor outputs a velocity component vx which is less than velocity component vx0 due to the rolling motion of the tire.

FIG. 6 shows a first example of a time curve of velocity component vz as the motor vehicle travels past measuring head 26, together with correlation sensors 28 through 36, without the motor vehicle having been excited to vibrate as the result of traveling over an obstacle.

Velocity component vz which is output by body correlation sensors 28 and 30 is therefore constant and equal to zero.

Velocity component vz which is output by middle wheel correlation sensor 34 is zero between t0 and t1, is less than zero at t1, and up until t3 continuously increases, is zero at t2, and is greater than zero at t3. After t3, velocity component vz which is output by middle wheel correlation sensor 34 is again zero.

Velocity component vz which is output by upper wheel correlation sensor 32 and lower wheel correlation sensor 36, which are shown combined in FIG. 6, is zero from t0 until just after t1, and is then less than zero and continuously increases until just before t3, at which point it is greater than zero. Velocity component vz of sensors 32 and 36 is then again zero. The time curve of output velocity component vz of wheel correlation sensors 32, 34, and 36 between points in time t1 and t3 is specified by the motor vehicle tire entering into the field of vision and by the rolling motion thereof.

Figure 7:
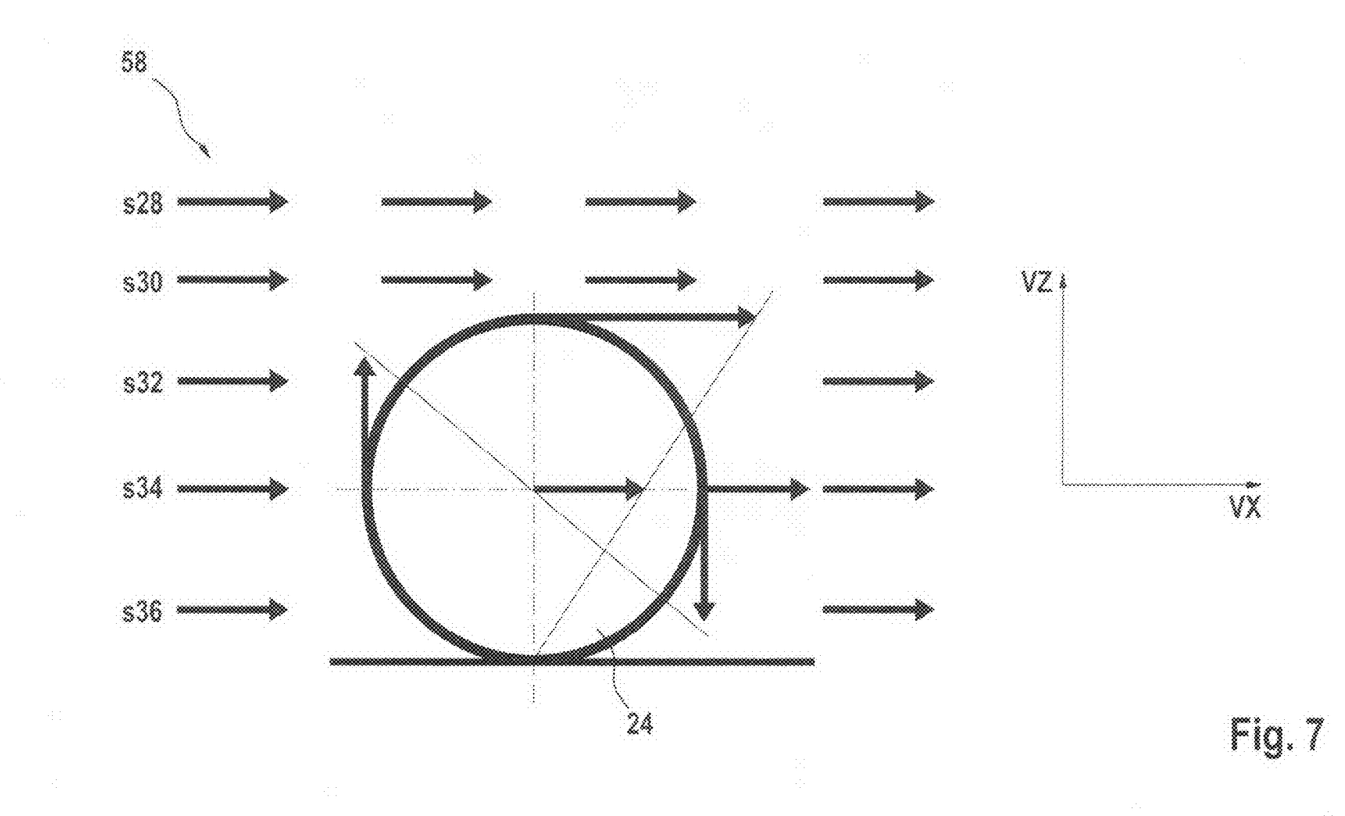
FIG. 7 shows a schematic illustration of motion vector field on the wheel and body as the motor vehicle travels past the correlation sensors of the measuring head from FIG. 2, according to one exemplary embodiment of the present invention.

FIG. 7 shows a schematic illustration 58 of motion vectors on the wheel and body when a motor vehicle travels past correlation sensors 28 through 36 of measuring head 26, without the motor vehicle having been excited to vibrate.

As long as the motor vehicle wheel is not in the field of vision of the particular sensors, the motion vector computed by the correlation sensors has only a constant vx component, and vz component is zero in each case. When the motor vehicle enters the field of vision, motion component vx is zero and motion component vz is greater than zero. Likewise, when the motor vehicle wheel exits the field of vision, the motion component is negative. When the rolling motion of the tire is detected at the height of the tire, motion component vz is zero, and motion component vx is greater than normal motion component vx0.

This results from the imaging of the rolling motion by the correlation sensor.

For improved clarity, the time curve of the velocity components and the motion vector field while traveling past the correlation sensors is illustrated in FIGS. 5, 6, and 7 without vibration excitation. During a vibration excitation, velocity components vx and vz would represent the vibration of the motor vehicle; the decomposition into velocity components vx and vz as well as the corresponding motion vector field are not illustrated for the sake of simplicity.

Figure 8:
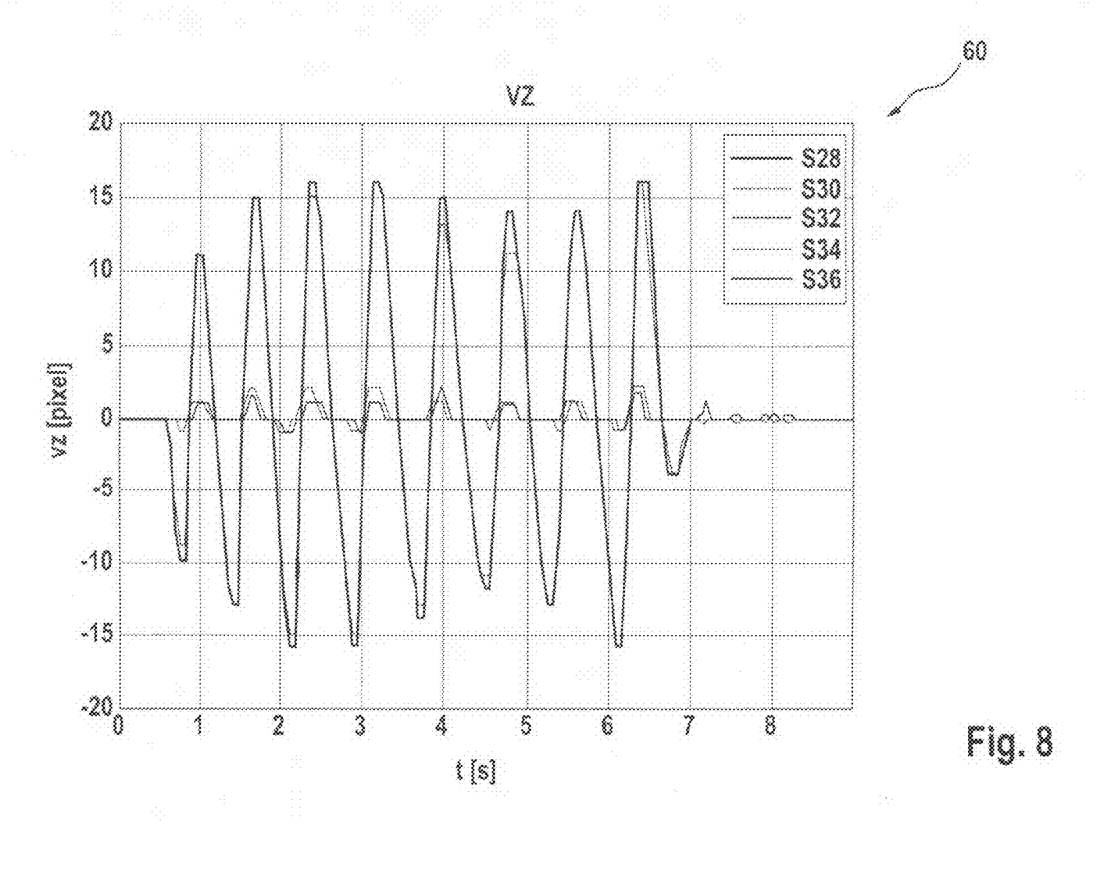
FIG. 8 shows an illustration of the vibration result for the wheel and body according to one exemplary embodiment of the present invention, as determined by a data processing unit on the basis of the output signals of the correlation sensors during manual rocking of the standing body.

FIG. 8 shows an illustration 60 of the vibration result for the wheel and body, as determined by a data processing unit from the output signals of correlation sensors 28 through 36 during manual rocking of the standing body.

In illustration 60 of the vibration result for the wheel and body, which corresponds to a representation of velocity components vz over time delivered by correlation sensors 28 through 36, a relatively small wheel vibration and a much greater body vibration are apparent. The amplitude of the wheel vibration in the z direction varies between 1 and 4 pixels, and the amplitude of the body vibration varies between 10 and 16 pixels.

In FIG. 8, the body motion has been determined from the integral of the measured displacement values of sensors 28 through 36.

The vibration behavior of the motor vehicle wheel and body may thus be determined easily and very accurately using correlation sensors 28 through 36. The relevant parameters for the motor vehicle shock absorber may be determined from this vibration behavior, using methods which are known to those skilled in the art and which require no further explanation here. This may be achieved using a mechanical equivalent model as described in EP 0 611 960, for example, which is known to those skilled in the art. Another example of a method is known from R. 322550 (provide German application number here).

Figure 9:
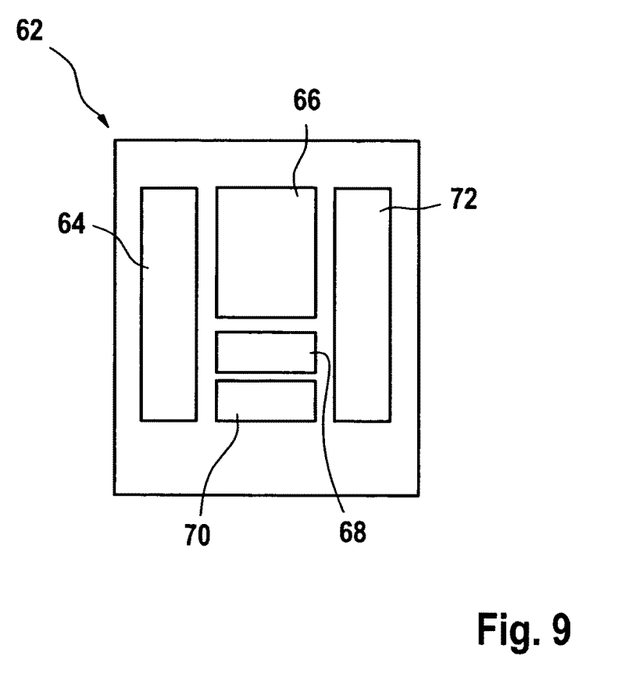
FIG. 9 shows an example of a correlation sensor block diagram according to one exemplary embodiment of the present invention.

FIG. 9 shows an example of a correlation sensor block diagram 62 according to one exemplary embodiment of the present invention.

According to the figure, a correlation sensor includes image field 66 (image array), on which the image of an observed measuring section on the motor vehicle is received. Using a digital signal processor 68 and an oscillator 70, the signals received at that location are converted to signals for velocity components vx and vz, which are output via serial lines 72 to a data processing unit. Correlation sensor 62 also has a power supply 64.

Although the present invention has been explained with reference to shock absorber testing, the chassis testing unit according to the present invention may also be used for other chassis components.

What is claimed is:

1. A chassis testing unit for a motor vehicle on a test set-up, comprising:
   at least one correlation sensor, having an associated lens, situated at the side of the test set-up, the correlation sensor being directed toward the test set-up and being designed to detect a time sequence of images of a section of a motor vehicle, moving on the test set-up, and to ascertain directional velocity components (vx, vz) therefrom, and
   a data processing unit which is connected to the correlation sensor or the correlation sensors and which is designed to determine the motion of the motor vehicle on the basis of the directional velocity components (vx, xz) of the at least one correlation sensor.

2. The chassis testing unit as defined in claim 1, wherein the correlation sensor detects a time sequence of images of the body of the motor vehicle and of the motor vehicle wheel, and wherein the data processing unit determines the motion of the body of the motor vehicle and of the motor vehicle wheel.

3. The chassis testing unit as recited in claim 1, wherein multiple correlation sensors are provided at different heights in order to detect sections of the motor vehicle having different heights.

4. The chassis testing unit as recited in claim 3, wherein at least one wheel correlation sensor is situated at the height of the motor vehicle wheel in order to detect an image of a section of the motor vehicle wheel,
   the at least one correlation sensor being designed to detect a time sequence of images of a section of the motor vehicle wheel moving on the test set-up, and to ascertain directional velocity components (vx, vz) therefrom.

5. The chassis testing unit as recited in claim 3, wherein at least one body correlation sensor is situated at the height of the body in order to detect an image of a section of the body, the at least one correlation sensor being designed to detect a time sequence of images of a section of the body of the motor vehicle moving on the test set-up, and to ascertain directional velocity components (vx, vz) therefrom.

6. The chassis testing unit as recited in claim 4, wherein at least one body correlation sensor is situated at the height of the body in order to detect an image of a section of the body, the at least one correlation sensor being designed to detect a time sequence of images of a section of the body of the motor vehicle moving on the test set-up, and to ascertain directional velocity components (vx, vz) therefrom.

7. The chassis testing unit as recited in claim 1, further comprising an obstacle to be driven over by the motor vehicle and for excitation of shock absorbers of the motor vehicle, wherein the obstacle is situated in front of the at least one correlation sensor, relative to the direction of motion of the motor vehicle, or at the height of the at least one correlation sensor.

8. The chassis testing unit as recited in claim 7, wherein a system of correlation sensors is provided which includes at least two groups of correlation sensors adjacently situated relative to the direction of motion of the motor vehicle.

9. The chassis testing unit as recited in claim 1, further comprising a drop indicator or a vibration plate for a motor vehicle wheel for exciting a shock absorber of the motor vehicle, wherein the drop indicator or the vibration plate is situated at the height of the at least one correlation sensor, relative to the direction of motion of the motor vehicle.

10. The chassis testing unit as recited in claim 1, wherein a measuring head which includes at least one correlation sensor is provided at the side of the test set-up.

11. The chassis testing unit as recited in claim 10, wherein a second measuring head is situated at the side of the test set-up, on the opposite side in the transverse direction of the vehicle, the second measuring head including at least one correlation sensor.

12. The chassis testing unit as recited in claim 1, which is a shock absorber testing unit for a motor vehicle.

13. A method for testing a chassis of a motor vehicle, comprising:
   exciting the motor vehicle to vibrate;
   detecting time sequences of images of sections of the motor vehicle moving on the test set-up, using correlation sensors, each having an associated lens, which are situated at the side of the test set-up, and ascertaining directional velocity components (vx, vz) therefrom; and
   determining the motion of the motor vehicle of the body and of the motor vehicle wheel, on the basis of the directional velocity components (vx, vz) of the motor vehicle, using a data processing unit.

14. The method for testing a chassis as recited in claim 13, wherein motion of the body of the motor vehicle and of the motor vehicle wheel are determined.

* * * * *